INVENTORS
EARL K. HOYNE
GARY F. LEGRAND
BY Kinney, Alexander,
Sell, Steldt & DeLaHunt
ATTORNEYS INVENTORS
EARL K. HOYNE
GARY F. LEGRAND
BY Kinney, Alexander,
Sell, Steldt & DeLaHunt
ATTORNEYS

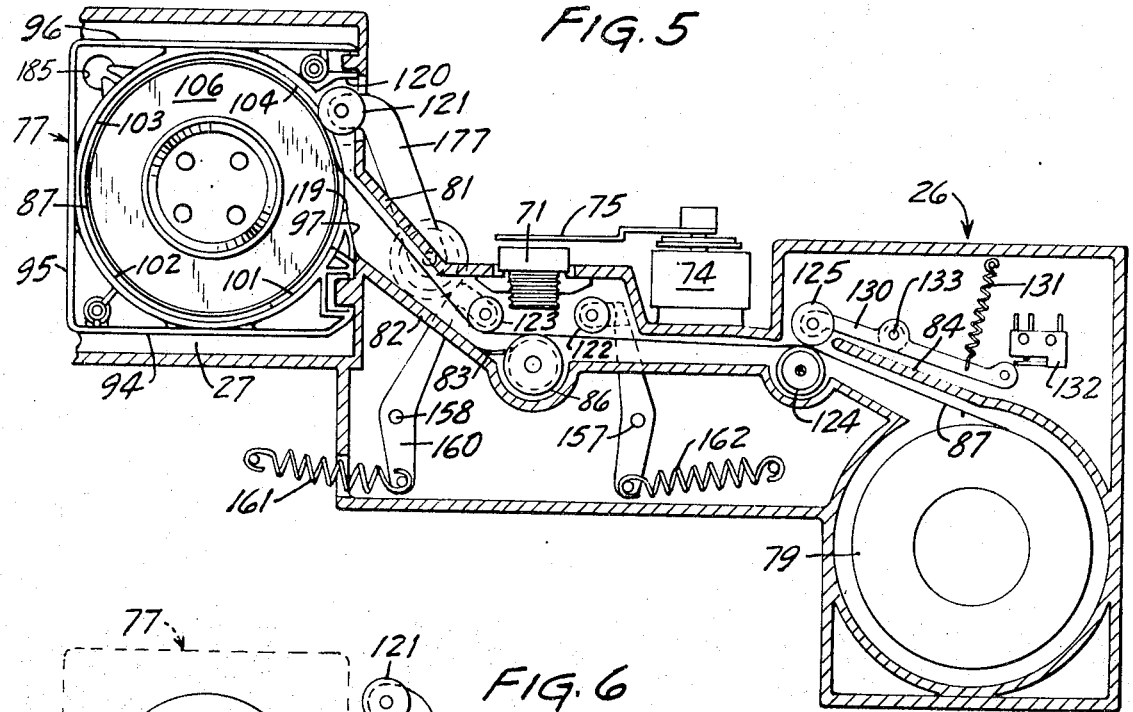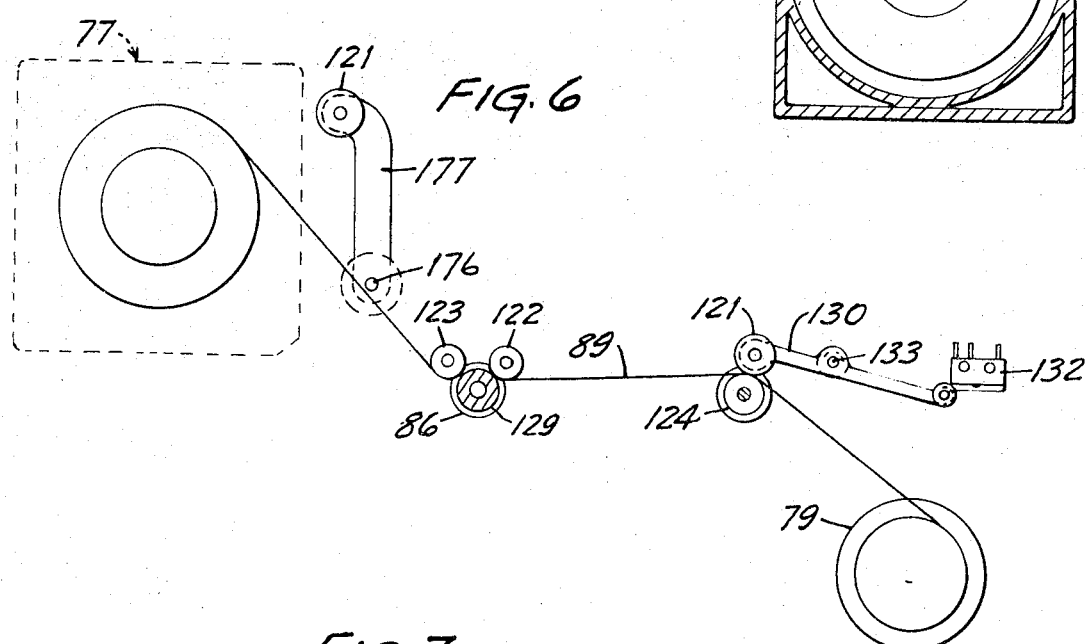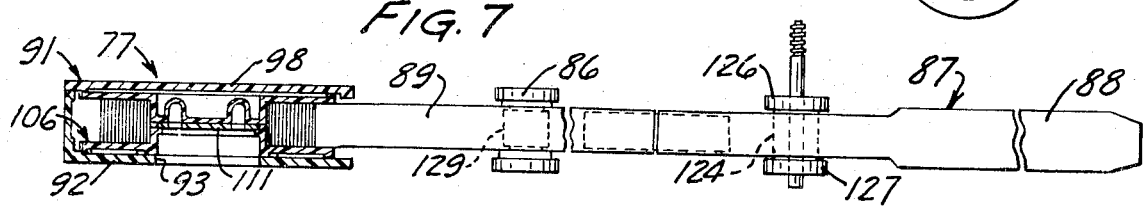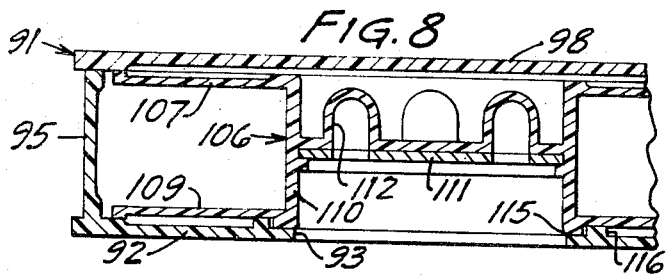

United States Patent Office

3,539,257
Patented Nov. 10, 1970

3,539,257
DOCUMENT PHOTOGRAPHING MACHINE
Earl K. Hoyne, Minneapolis, and Gary F. Le Grand, White Bear Lake, Minn., assignors to Minnesota Mining and Manufacturing Company, St. Paul, Minn., a corporation of Delaware
Filed Feb. 14, 1968, Ser. No. 705,518
Int. Cl. G03b 27/70
U.S. Cl. 355—65
7 Claims

ABSTRACT OF THE DISCLOSURE

A document photographing machine for photographing successive documents held on a drum as the documents move past a photographing station. The machine comprises means for supporting a cartridge containing a supply of light-sensitive microfilm wound on a reel with the emulsion side out, means for automatically threading the microfilm from the cartridge to a take-up reel, means for rewinding the exposed film back into the cartridge, and an optical system consisting of an objective lens and mirrors to permit direct exposure of the documents and to impart reduced size images to the film.

---

This invention relates to a document photographing apparatus and in one aspect to a machine for making photographic images on microfilm of documents which are fed successively through the machine and which move continuously past a photographing station.

Microfilm cameras or document photographing cameras are well known in the art. These prior known cameras have varied means of transporting the document, varied optical systems for imparting an image from the document to the film, and for supplying the microfilm to the camera.

A preferred transport in many of the prior art cameras includes a drum around which the document to be photographed is conveyed. These drums use a system of rollers or belts and the document is progressively moved past a photographing station which generally is defined by and includes a transparent glass plate. See for example United States Letters Patent Nos. 2,377,525; 2,481,694; 2,521,951; and 2,682,194.

However when the glass flats are used the resolution of the projected image is degraded. In overcoming this, different types of document transports have been used (see United States Letters Patent No. 3,342,100) or the photographing stations have been changed to follow a slightly helical path to maintain control of the document and yet afford an open optical path or an optical path permitting direct exposure of the document. This latter type of system is shown for example in United States Letters Patent No. 2,472,931. This latter system has the disadvantage however in that an increase in the size of the elements, i.e., mirrors and lens, in the optical system is necessary. To view the same area of the document the mirrors must have a width equal to the circumferential or arcuate extent along the drum from the lead edge of the slot to the trailing edge, and the diameter of the objective lenses must be greater to receive the image from the oblique object plane than is necessary to receive a corresponding reduced size image from an object plane parallel to the axis of the drum.

Further, film has most frequently been supplied to the camera on a spool or reel to be threaded through a path by hand to properly load the camera. This generally requires at least some degree of operator education before one becomes proficient and requires a certain amount of time, even for the most proficient, and a dark room or subdued light facility to minimize exposure of the film.

This situation has been improved by the use of loaded magazines (see United States Letters Patent No. 2,771,816). A magazine however which has two film spools journalled in the magazine, a film pressure plate and pressure or backing rollers for assisting in driving the film is a more expensive package for film than a single spool or the use of a single spool in an enclosed cartridge as contemplated with the present invention. These magazines cannot be inserted and removed at will without exposing the film across the pressure plate. Further, the magazine was useful only to supply film to the camera. The cartridge as used with the machine of the present invention is also usable for storing the undeveloped or subsequently developed film and is used with readers and/or readers and printers to reproduce a hard copy of microfilmed images.

The present invention provides a document photographing or microfilming machine which overcomes the disadvantages of prior but only functionally similar equipment. The apparatus of the present invention provides the improved resolution obtained by projection of a light image directly from the document to the lens, a simple document transport which will convey the documents past the photographing station object plane without jamming or wrinkling the document by the use of a drum which has an internal attractive force to hold the document thereon, a light source which is cooler, more efficient and uniform, an optical system having small optical elements providing the desired reduction, means to automatically thread film supplied by a simple cartridge past an image plane to a take-up reel, means for indicating the advancement of predetermined lengths of film past said image plane, and means for rewinding the film back into the cartridge.

This combination of elements affords the above advantages and overcomes the problems encountered with similar machines.

The features of this invention which are referred to above and others will be more readily understood after reading the following detailed description which refers to the accompanying drawing wherein:

FIG. 5 is a fragmentary plan view of the film-handling means of the machine;

FIG. 6 is a schematic view showing the film-handling means of FIG. 5 in operative position;

FIG. 7 is a detailed view showing the film supply cartridge, film and leader, and the elevational view of the film drive capstan and drive member for the counter; and FIG. 8 is a fragmentary sectional view of the film cartridge.

Figure 1:
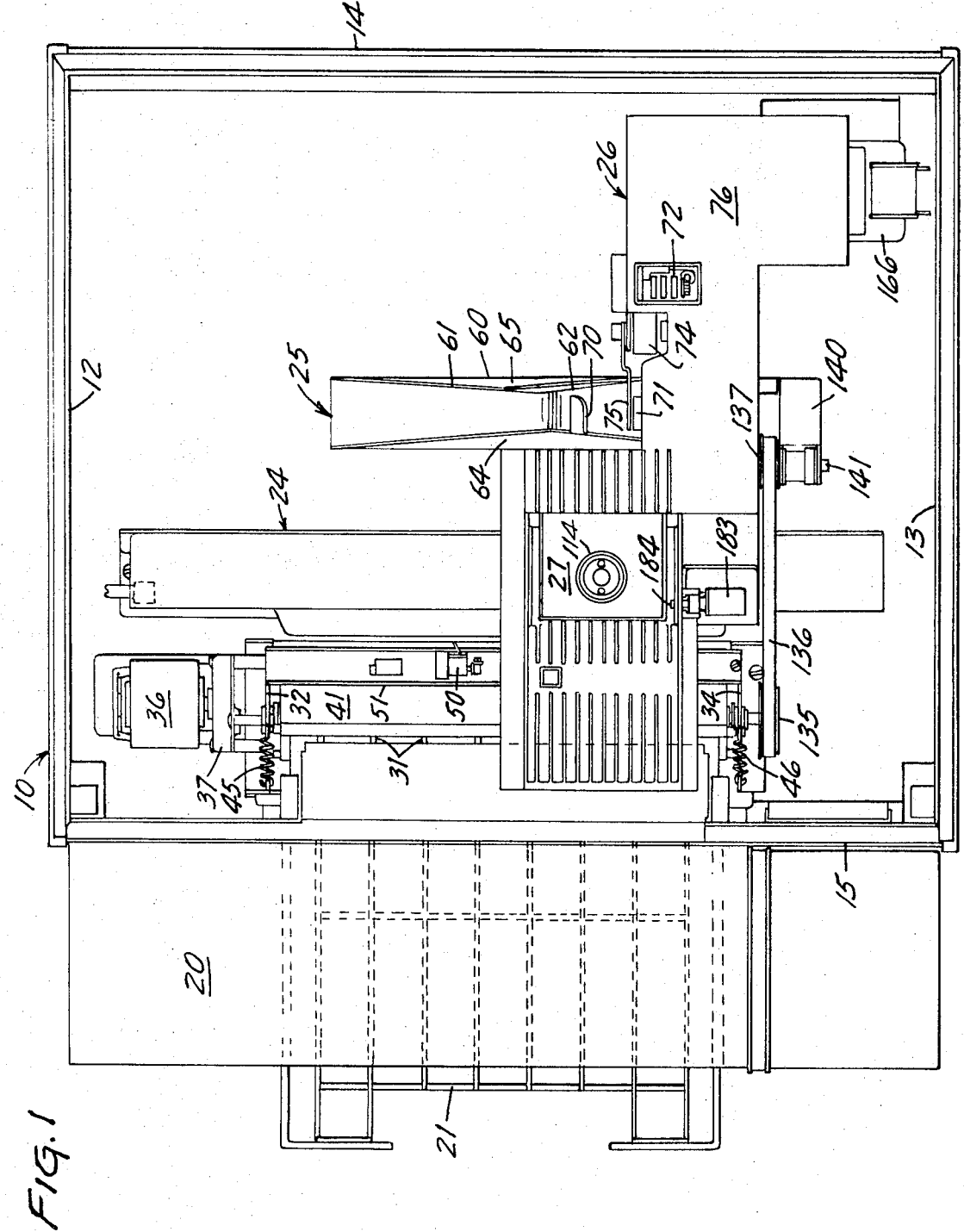
FIG. 1 is a plan view of a machine formed in accordance with the present invention, with a cover of the cabinet or housing removed.

Referring now to the drawing wherein like reference numerals in the several views refer to identical parts, the document photographing machine, hereinafter referred to as camera 10, comprises a base or mounting frame 11 for the camera elements and housing including transversely spaced side walls 12 and 13, a rear wall 14, a front wall 15, and a cover (not shown). The front wall 15 has wall means defining two apertures which extend transversely of the machine defining an inlet opening 17 and an outlet opening 19. Disposed and supported from the housing forwardly of the inlet opening is a shelf 20 upon which documents to be photographed may be placed and aligned for proper movement into the camera. A wire-formed tray 21 is supported from the housing beneath the outlet opening 19 to receive the documents as they are discharged from the camera. Supported by the frame 11 are: a document transport device generally designated 22, positioned adjacent the inlet and outlet openings 17 and 19 respectively; a light box or illuminating device generally designated 24; a mirror supporting frame generally designated 25; and disposed in a plane adjacent the top of the camera is a frame or housing 26 enclosing the film-handling apparatus and which housing 26 has means defining a film cartridge receiving and supporting platform 27.

The document transport device 22 comprises a carrier roll including an insulating core 29, formed preferably of a dark or black phenolic resin, and covered with a layer of the resilient compressive foam composition 30 formed for example of a resinous material, preferably an ester-based polyurethane or an ether-based polyurethane, having a dielectric property, as will be hereinafter understood. The foam covering 30 is formed with axially spaced circumferentially extending grooves 31 which are equidistantly spaced and cut down to the surface of the core 29. The carrier roll is supported on a shaft 35 journalled at each end in transversely spaced parallel vertically extending plates 32 and 34. The roll and shaft are driven by a motor 36 through a suitable reduction gear box 37 which directly drives one end of the shaft 35. Supported also between the plates 32 and 34 is a pick-off bar 39 having a plurality of fingers 40 spaced therealong at intervals corresponding to the spacing of the grooves 31. Wrapped about the carrier roll and urged into contact with the peripheral surface of the foam coating 30 is a shoe 41 formed of a sheet of flexible sheet material which is either coated or impregnated with a material which, when in contact with the resinous foam covering of the carrier roll and moved relative thereto will cause a charge to be developed on the carrier roll due to the tribo electric effect. The two dielectrics, the foam covering on the carrier roll and the coating of or material impregnated into the sheet material forming the shoe, should be so chosen that a charge is produced on the drum which when contacted by a document will attract the document and assure contact of the document with the carrier roll. The attractive force caused by a positive charge on the roll causes the document to conform to the profile of the roll during movement thereof by the carrier roll.

The shoe 41 has the trailing edge adjacent the outlet 19 affixed between the plates 32 and 34 by means of a rod 42 and is connected at its opposite edge to a transversely extending rod 44, which rod 44 has its ends joined to an end of two tension springs 45 and 46. The tension springs are connected at their other ends to ears of the plates 32 and 34 and serve to urge the shoe into contact with the carrier roll. The shoe 41 has an elongated narrow slit 47 which extends axially of the carrier roll and this slit defines a photographing station adjacent the periphery of the transport and defines the limits of the object plane on the carrier roll viewed by the exposure station to be hereinafter described. The trailing lip of the slit 47 defining the photographing station is spaced radially slightly from the surface of the carrier roll to avoid contact with the lead edge of a document which could result in wrinkling of or stoppage of document movement through the camera if a document had a creased or dog-eared edge or if its stiffness was such that it could not be held close to the carrier roll by the charge or attractive force of the roll. A frame 49 is secured to the shoe 41 adjacent the slit 47 and serves to strengthen the shoe in this area.

For use with the polyesterurethane or polyetherurethane foams it is found that a shoe 41 formed of an aluminum sheet clad with a polytetrafluoroethylene coating or a shoe formed of a sheet of polytetrafluoroethylene impregnated aluminum, as sold by Nimet Industries, Inc., South Bend, Ind., under the trade name "Nituff," have dielectric properties to produce the desired static charge on the carrier roll.

A document switch 50 is supported on a brace 51 extending above and between the plates 32 and 34. Depending from a bar below the switch and extending through a number of slots 52 in the shoe 41 is one or more trigger arms 53. The trigger arms 53 extend into the grooves 31 such that when a document is introduced through the inlet opening 17 to be picked up by the carrier roll and transported about the surface of the carrier roll it will contact a trigger arm 53 to operate the switch 50 to control further functions of the camera to be hereinafter described. The plural trigger arms permit operation of the camera by documents of different widths.

As the document is moved about the periphery of the carrier roll between said periphery and the inner surface of the shoe 41 it is transported at a constant rate past the slit 47 exposing the document to a source of light which is generated in the document illuminating device 24. In the illustrated embodiment the document is illuminated by means of two fluorescent tubes or lamps, preferably in spectral compatibility with the film. The lamps extend transversely of the camera and parallel to the carrier roll within a housing 55. An opening in the housing 55 adjacent to slit 47 allows the light to expose the document. The housing 55 serves not only to enclose the lamps and avoid stray light in the camera, but the back wall of the housing 55 is formed with a slotted opening 56 which defines an aperture stop for the optical system of the camera. The two lamps 57 and 59 are preferably photogreen fluorescent tubes to produce a light predominately in the visible green spectrum which is most compatible with panchromatic film. The tubes are wired to a direct current source to provide a constant light output, thereby avoiding variation in image density on the film, as is typically seen when alternating current sources are used. Two photocells (not shown) may be disposed within the housing 55 and positioned near the midpoint of the lamps and set to actuate a front panel indicator when either lamp does not function and to trigger a switch to stop the carrier roll motor 36, thereby preventing further operation without the desired result.

The mirror supporting frame 25 has a generally triangular configuration with a base 60 secured to the frame 11 and angularly disposed converging upper members 61 and 62, having side plates 64 and 65 which serve to enclose a first mirror 66 and a second mirror 67. The plate 64 is formed with an opening 68 allowing mirror 66 to view the slit 47 through the openings in housing 24. The first mirror 66 is a planar elongated first surface mirror extending parallel to the axis of the carrier roll but having its planar surface inclined 45 degrees to the vertical and inclined 45 degrees to the path of the light through housing 24. The second mirror 67 is also a planar first surface mirror and is disposed vertically above the first mirror 66 and is disposed in a plane oblique with respect to the axis or direction of extent of the first mirror. The second mirror 67 is positioned to receive light reflected from the first mirror to reflect the light in a direction, the path of the light being in a plane, generally parallel to the axis of the first mirror and the axis of the carrier roll. After the light is reflected from the second mirror the reflected image is directed through an opening 70 in the mirror housing 25, to an achromatic objective lens mounted in a barrel 71 at the exposure station, which will hereinafter be described. Mounting members for the mirrors 66 and 67 afford some adjustment to permit proper alignment of the light images to the axis of the lens. The plates 64 and 65 restrict the mirrors from reflecting or projecting stray light which might be present in the camera environment and thus reduce any unwanted reflections which could be superimposed upon the film on the desired image.

The housing 26 which supports the film-handling apparatus supports a counter 72 above the housing which is visible to the operator and is operated by movement of the film. Housing 26 also supports a solenoid 74 which operates a shutter blade 75 positioned in front of the objective lens barrel 71. As viewed more clearly in FIG. 5 there is illustrated therein the housing 26 with a top plate 76 removed showing the interior of the housing and showing a film cartridge 77 which has its top plate removed to illustrate the interior of the cartridge. Cartridge 77 is also illustrated in FIGS. 7 and 8.

The housing 26 is formed with guide members which extend from the cartridge-supporting platform 27 through or form walls for the housing 26 defining a path toward a take-up reel 79 mounted in the housing. The guide members are designated by the reference numerals 81, 82, 83, and 84. These members generally constitute wall members in or for the housing 26. A film 89 may be automatically threaded along the path from a film supply cartridge 77, through the housing 26 between one end of the objective lens barrel 71 and a capstan 86 defining the image plane, past a driving element for the counter 72 to the rotatably driven takeup reel 79. The guide members assure the movement of a leader 87 attached on the forward end of a strip of film 89 along a first path through the housing to a position between the reel flanges on a take-up reel 79. The take-up reel has at least one of the flanges spring-biased toward a minimum spaced position relative to the other flange. This structure serves to grasp a free end portion 88 of the leader, which portion has a greater width than said minimum spacing. The grasping of the leader affords winding engagement of the leader 87 and film 89 on the take-up reel. The take-up reel and its operation for automatic threading is disclosed and claimed in U.S. Pat. No. 3,149,797, assigned to the assignee of this application. When the leader is threaded the film is moved to a second film path which is more restricted as will hereinafter be described.

Figure 2:
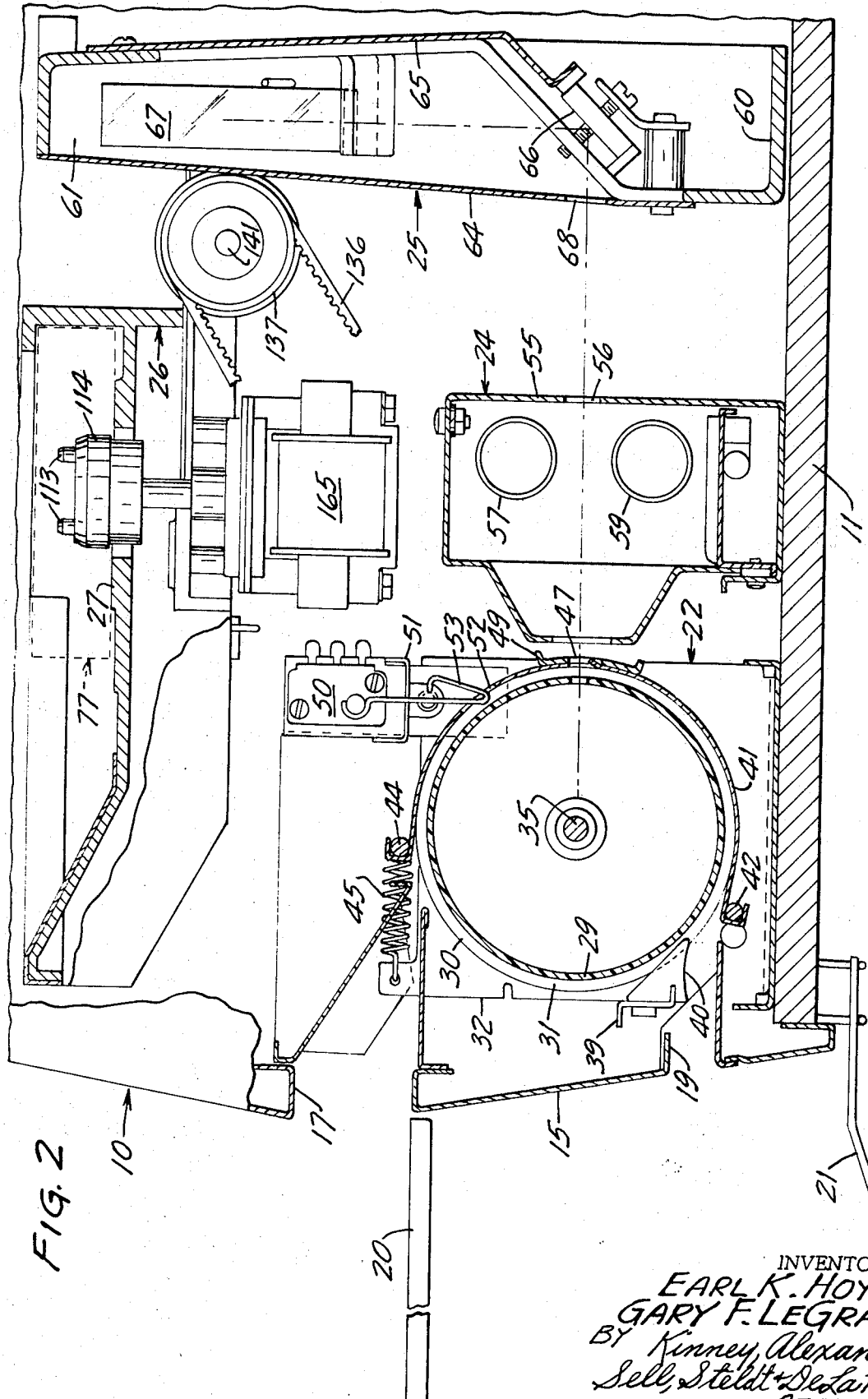
FIG. 2 is a fragmentary longitudinal sectional view of the machine of FIG. 1.
Figure 3:
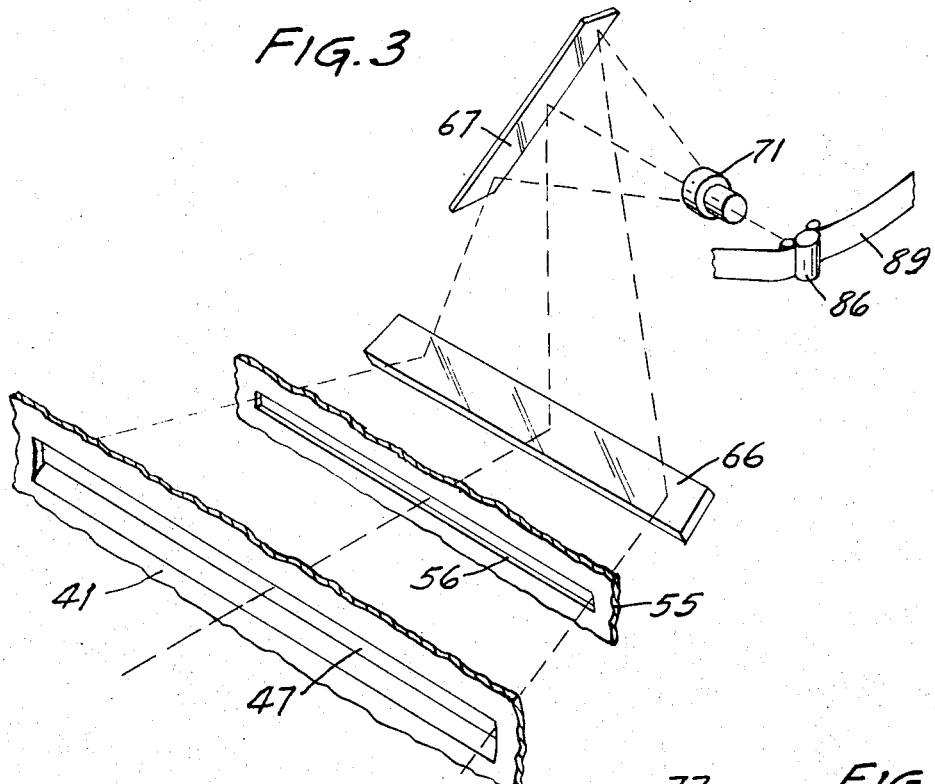
FIG. 3 is a schematic view of the optical system of the machine between the photographing and exposing stations.

Referring now to the film cartridge 77 it comprises a box-like container 91 having a bottom wall 92 formed with an enlarged central aperture 93, edge walls 94, 95, 96, and 97, which join the bottom wall 92 to a solid top cover 98. In the interior of the box-like container 91 the edge walls are formed with arcuate wall surfaces 101, 102, 103, and 104 which with the edge walls define a generally cylindrical cavity within the box-like structure. A film supply reel 106 is rotatable within the cavity. The reel 106 comprises spaced parallel side flanges 107 and 109 joined by a hub 110 having a central supporting ferrous metal disk 111 formed with socket-like members 112. The members 112 are adapted to receive projections 113 on a drive spindle 114 (FIG. 2) extending through the cartridge support platform 27. As shown most clearly in FIG. 8 the hub 110 has an axial projection 115 which fits within a circular ring 116 on the inner side of bottom plate 92 adjacent the aperture 93. The projection 115 and ring 116 form a labyrinth seal preventing light from entering the cartridge. It will also be noted that the diameter of the reel flanges 107 and 109 is less than the diameter of the cavity defined by the arcuate wall members. The film 89 is secured to the hub by a trailer and is wound on the reel 106 with the light-sensitive emulsion side of the film on the outer surface. The leader 87 is attached to the free end of the film and as noted in FIG. 7 the leader 87 has a portion which is as wide as the film and the portion 88 of greater width than the film 89. This portion of greater width is wound on the outer peripheral surfaces of the flanges 107 and 109 and is accommodated within the cavity defined by the arcuate wall members. The leader is formed of an opaque material and protects the film from the light when wound within the cartridge as it has a length sufficient to make several wraps about the reel. The flanges and hub of the reel 106 and the cartridge are also formed of opaque material.

The edge wall 97 of the cartridge has an opening 119 through which the leader and film may pass as it is pushed and withdrawn from the cartridge by the film transport past the exposure station. This opening 119 is positioned between the arcuate wall portions 101 and 104 generally centrally of the edge wall 97. A smaller opening 120 in the wall 97 exposes only a portion of the wide leader when it is wound upon the outer peripheral flanges of the supply reel. The opening 120 can receive a driven roller 121, which roller can frictionally contact the wide portion 88 of the leader 87 and move the leader 87 in an unwinding direction within the cavity to push the free end of the leader to the opening 119 at which it will be free to move out of the cartridge into the guide channels defined by guides 81 and 82.

As the leader is pushed along the guide path, as illustrated in FIG. 5, from the supply reel 106 toward the take-up reel 79 it passes between two movable spring-biased pressure rollers 122 and 123 and the capstan 86. The capstan 86 is a single roller formed with axially stepped surfaces, each having a different diameter. When the narrow portion of the leader 87 or the narrower film 89 is positioned at the capstan it can be moved, under the influence of the pressure rollers 122 and 123, from a first path adjacent the larger diameter axially spaced portions to a second path to engage an inner cylindrical portion 129 of the capstan 86 defining the image plane and having a smaller diameter and greater length than the other portions. In this position the larger diameter portions guide the film to position it in proper relationship with the axis of the objective lens.

As the leader and film move between the capstan 86 and the take-up reel 79 it also moves between two axially spaced rollers 126 and 127, which are rotatably mounted above and below a driving element or capstan 124 which is fixed to a shaft carrying a worm gear to drive the counter 72, and a pressure roller 25. The profile of the counter drive member is illustrated in FIG. 7 and after the wide portion 88 of leader 89 passes the axially spaced rollers, the pressure roller 125 forces the trailing portion of the leader and the film into driving position against the roller 124 to start the counter 72. Continued winding of film on the take-up reel thus drives the counter from the film. The movement of the film against capstan 124 also serves to sense the completion of the film threading operation and indicates this fact. The pressure roller 125 is mounted at one end of a lever 130 which is biased by a spring 131 in a direction to move the roller 125 against the capstan 124. When the narrower portion of the leader passes between these two members the spring causes the lever 130 to move about its pivot point or fulcrum 133 and the opposite end of the lever engages a switch blade closing a switch 132 to indicate the completion of threading and actuate a further function of the machine. The next function is to move the film 89 from the first threading path to the operative second path filming position against the smaller portion 129 of the driven capstan 86, as discussed above, and to withdraw the drive roller 121 from the opening 120 in the cartridge. These movements are accomplished by cams and cam followers, as will be described hereinafter.

Figure 4:
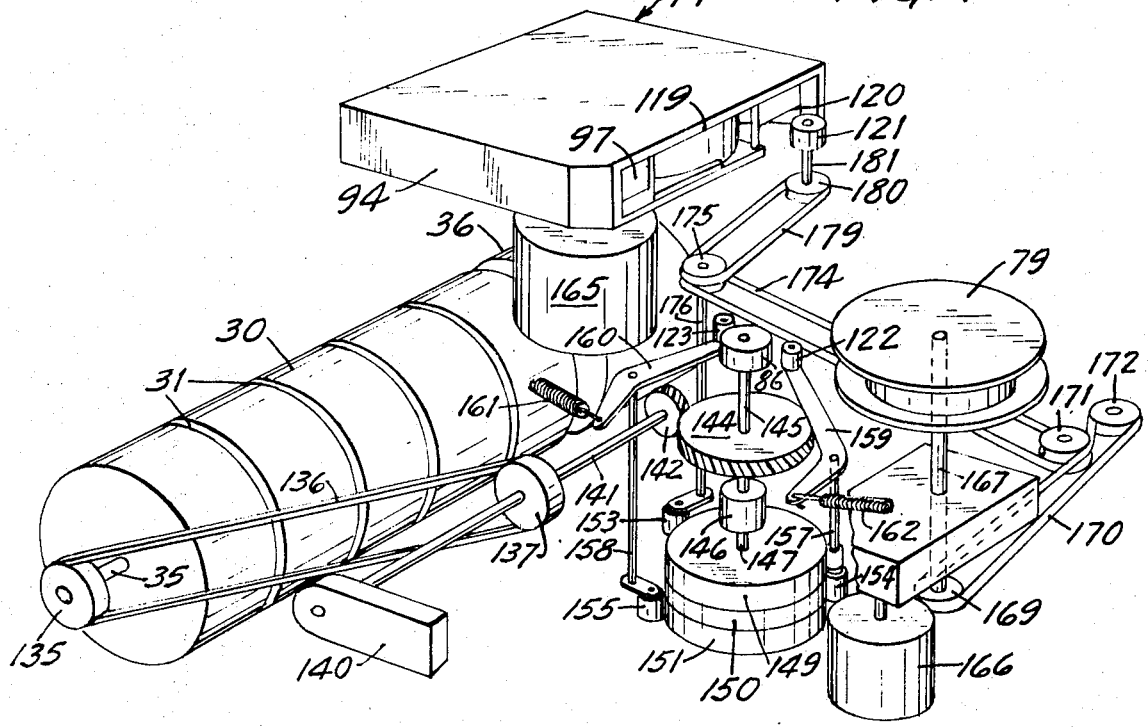
FIG. 4 is a schematic perspective view of the drive and mechanical control members of the machine of FIG. 1.

The drive system for the camera is illustrated schematically in FIG. 4. The motor 36 directly drives the document carrier roll shaft 35 at one end and the opposite end of the shaft has a pulley 135 connected thereto. The pulley 135 drives a timing belt 136 extending from the pulley 135 to a pulley 137 supported on an input hub of a one-way solenoid-operated spring clutch 140. When the clutch 140 is energized the driven pulley 137 causes the rotation of an output shaft 141, which rotation, through crossed helical gears 142 and 144, rotates a shaft 145 supporting the capstan 86. Positioned beneath the shaft 145 is a coaxial shaft 147 driven from the shaft 145 by a second electrically operated clutch 146. Three cams 149, 150, and 151, are supported on and are driven by the shaft 147. The three cams control the position of three associated followers 153, 154, and 155, respectively. The followers 154 and 155 serve to rotate shafts 157 and 158 secured to crank arms 159 and 160 upon which are mounted the pressure rollers 122 and 123. Thus in one position of the cams 150 and 151 the pressure rollers 122 and 123 are permitted to move against the capstan 86 under the bias of springs 161 and 162 to hold the film in contacting driving engagement with the portion 129 thereof. The rollers 122 and 123 hold the film in the image plane defined by portion 129 of the capstan such that images may be imparted to the film. In another position of the cams the pressure rollers 122 and 123 are moved away from the capstan 86 by the followers 154 and 155 against the bias of the springs 161 and 162, and cam 149 and follower 153 permit the movement of the roller 121, under the bias of a spring, into drive-out leader threading position. In still another position the rollers 122 and 123 are retracted and roller 121 is retracted, permitting a free path for rewinding of the film and leader back into the cartridge 77.

The rewinding operation is afforded by a motor 165 connected directly to the spindle drive 114. The take-up reel 79 is driven by a motor 166 through a shaft 167. Also mounted on the shaft 167 however is a pulley 169 around which extends a drive belt 170 serving to drive a double pulley 171 by contact with one periphery thereof during its movement between the pulley 169 and a spaced pulley 172. A second belt 174 is entrained around the pulley 171 and another double pulley 175 which is rotatably mounted on a shaft 176 supporting the cam follower 153. A crank arm 177 is secured to the shaft such that upon rotation of the shaft under the influence of the follower the roller 121 is moved into the opening 120 or is retracted therefrom. A third drive belt 179 in this series is driven by pulley 175 and drives the roller 121 through a pulley 180 and drive shaft 181 in a direction to push the leader in an unwinding direction to drive the leader out of the opening 119. As explained above, cams 149, 150, and 151 have cam surfaces to permit in one position retraction of rollers 122 and 123 and insertion of roller 121 to thread the film, in another, release of the rollers 122 and 123 and retraction of roller 121, and further, retraction of all those rollers during film rewind.

In operation the operator would place a cartridge 77 into the camera by placing the same on the supporting platform 27 with the hub disk 111 mounted on the spindle 114. The operator would then push appropriate buttons to commence the threading operation. The motor 166 for the take-up reel is energized driving belts 170, 174, and 179 to drive the roller 121. The motor 36 would drive the carrier roll to energize the pulley 137 such that upon operation of the solenoid clutch 140 and clutch 146 power would be carried to the cam shaft 147 to rotate the cams moving the roller 121 into the opening 120 and holding rollers 122 and 123 retracted as shown in FIG. 5. The clutch 146 would then be de-energized and the leader would be driven from the cartridge through the guide path toward the take-up reel 79. After the wide portion 88 of the leader passes between the counter capstan 124 and the pressure roller 125, switch 132 would close to stop the motor 166, and to energize the clutches 140 and 146 to rotate cam shaft 147 through another step to withdraw the roller 121 and permit movement of the pressure rollers 122 and 123 against the film 89 urging it into engagement with the reduced portion 129 of the capstan 86. The solenoid clutches 140 and 146 would then be disengaged. When a document such as a check, a record sheet, a letter, drawing, etc. is to be photographed, the document is moved across the shelf 20 into the inlet opening where it is contacted with the carrier roll and the document clings to the roll due to the electrical charge carried on the roll. The carrier roll and shoe 41 serve to carry the document toward the photographing station. The illuminating means or lamps 57 and 59 illuminate the slit 47. As the document moves toward the slit 47 it contacts a trigger 53 of the switch 50 causing the rotary solenoid 74 to move the shutter blade 75 to an open position with respect to the lens barrel 71, the motor 166 is energized to turn the take-up reel, and the solenoid clutch 140 is energized to rotate the capstan 86. This clutch arrangement accomplishes the connection between the transport or document feeding means 22 and the film feeding capstan 86 so that the film 89 is moved at a speed synchronized with respect to the movement of the document. The reduction ratio between the pulleys 135 and 137 and the crossed helical gears 142 and 144 are determined such that for a given carrier roll diameter and a given capstan diameter the light-sensitive film is advanced in synchronism with the movement of the document to afford a true photographic copy of the document. When the document releases arms of switch 50, the solenoid clutch 140, shutter solenoid 74 and take-up motor 166 are de-energized. The machine is ready to receive the next document.

Switch means (not shown) are provided on the counter 72 driven by the capstan 124 such that when a predetermined length of film has been withdrawn from the supply reel 106, the machine will stop. The switch means on the counter comprises small cams or projections on the counter wheels adjacent certain numbers such that when the desired sequence appears at the counter window (indicating a predetermined number of frames or length of film has moved past the capstan 86) switch contacts adjacent the counter wheels will be closed to discontinue operation, energize a visual or audible alarm, or actuate the camera for a further automatic function. If the machine mode is automatic the clutches 140 and 146 are energized to index the cams and open the path for rewinding and energizes the motor 165. If not automatic, the switch means may light an indicator lamp on the panel such that the operator will commence the rewind by appropriate action. Upon completion of the rewinding, sensed also by the switch 132, the motor 165 will be de-energized, after a predetermined delay to allow rewinding of the leader, and then stop the machine.

Electrical cartridge hold-down devices may be desired to lock a cartridge onto the support 27 after the film has been threaded into the camera. This may be accomplished by detents moved to a cartridge securing position by a solenoid or by spring-loaded detents released, and insertion or removal of the cartridge by energizing a solenoid. In any event, this type of lock protects against accidental removal of the cartridge when film has been withdrawn by requiring some operation other than just grasping a cartridge and lifting it off the platform. A solenoid 183 and detent 184 are shown in FIG. 1 adjacent the platform 27. Also, as shown in FIG. 5 the cartridge 77 has an opening 185 formed in the bottom wall 92, near one corner, which opening can receive a ball latch which secures the cartridge onto the platform 27. Recesses are formed in the wall 97 on either side of the opening 119 to receive detents projecting from the housing 26, which detents align the cartridge on the platform with the housing 26.

Having thus described the invention with reference to the illustrated embodiment, it will be appreciated that various changes can be made therein without departing from the spirit or scope of the invention.

What is claimed is:

1. A document-microfilming machine comprising in combination:

a housing, means defining an inlet and outlet in said housing for the documents to be filmed, document-transport means including means defining a photographing station in said housing disposed adjacent said means defining said inlet and outlet for transporting a document placed in said inlet past said photographing station and out said outlet, means within said housing adjacent said transport means for illuminating successive areas of said document as it is carried by said transport means past said photographing station, means defining an exposure station and defining a light path from said photographing station to said exposure station, and film-handling means at said exposure station for supporting a strip of film disposed in a plane normal to the plane of said photographing station, said film-handling means comprising:

means for receiving and supporting a film cartridge including a rotatable reel having a supply of film wound between the flanges thereof and an opaque leader attached to the free end of the film, a rotatable take-up reel spaced from said receiving and supporting means, means for moving and guiding said leader from said cartridge past said exposure station to said take-up reel, and synchronized drive means for driving said film past said exposure station to withdraw the same from said cartridge and for driving said document-transport means to expose said film to the successive image areas of the document as the document moves past said photographing station.

2. A machine as claimed in claim 1 wherein said means for moving and guiding said leader includes a driven roller movable from a retracted position to a position engageable with a said leader to drive the leader in an unwinding direction off said rotatable reel, and wall surfaces disposed adjacent said receiving and supporting means defining a constrictive path between said receiving and supporting means and said take-up reel along which path a said leader will move freely.

3. A machine as claimed in claim 2 wherein said exposure station, disposed along said path, is defined by a driven capstan having a cylindrical film-engaging surface of reduced diameter, pressure rollers biased toward said surface and positioned in circumferential spaced relation relative to said surface for holding a film in driving engagement with said capstan and in position thereon to receive an image, and lens means, the axis of which is normal to the axis of said capstan, positioned to direct a light image onto a film supported by said capstan between said rollers.

4. In a document-microfilming machine including a document-transport means, image-projecting means, and film-advancing means, the improvement comprising the combination of:

an electrically insulated drum coated with a first material, a shoe formed of a flexible material disposed around a portion of said drum and spring means for urging said shoe into engagement with said drum, said shoe having means defining an object plane disposed to extend along the periphery of the drum parallel to the axis thereof, means for rotating said drum relative to said shoe, and at least one of said first material or said flexible material being a material which will release electrons with comparative ease and the other being capable of acquiring electrons easily such that upon movement of the drum relative to, and during engagement with, said shoe the drum becomes charged whereby documents contacting said drum will be attracted to said drum surface by the electrostatic charge and carried by said drum surface between the periphery of the drum and said shoe to transport said document.

5. In a document-microfilming machine as defined in claim 4 wherein said first material is a resilient compressible foam material.

6. In a document-microfilming machine as defined in claim 5 wherein said foam material is an ester- or ether-based polyurethane.

7. In a document-micro-filming machine as defined in claim 5 wherein said foam material is a polyurethane foam coating having axially spaced circumferential grooves formed therein and said shoe is formed of a sheet material including polytetrafluoroethylene.

References Cited

UNITED STATES PATENTS

| | | | |
|---|---|---|---|
| 2,606,478 | 8/1952 | Pratt et al. | 355—65 |
| 2,682,194 | 6/1954 | Rosenburgh | 355—65 |
| 2,845,841 | 8/1958 | Collins | 355—65 |
| 2,953,061 | 9/1960 | Pfaff | 355—65 |
| 3,183,767 | 5/1965 | Brownscombe | 355—65 |
| 3,208,682 | 9/1969 | Pastor et al. | |
| 3,309,960 | 3/1967 | Delplanque | 355—3 |

JOHN M. HORAN, Primary Examiner

D. J. CLEMENT, Assistant Examiner

U.S. Cl. X.R.

355—66, 51, 49, 75